United States Patent Office 3,446,998
Patented May 27, 1969

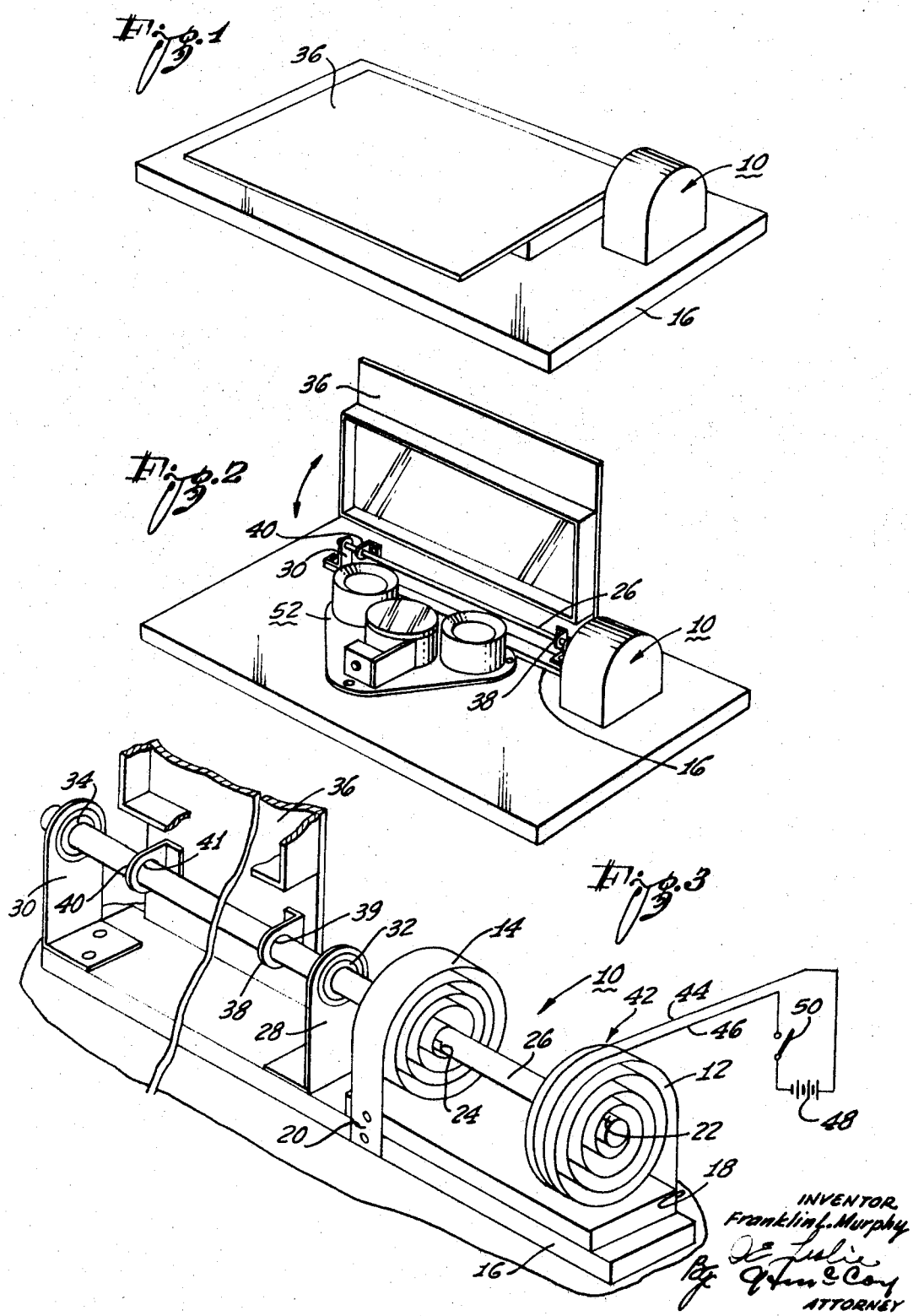

3,446,998
BIMETALLIC POWER CONTROLLED ACTUATOR
James E. Webb, Administrator of the National Aeronautics and Space Administration with respect to an invention of Franklin L. Murphy, Los Angeles, Calif.
Filed Feb. 17, 1967, Ser. No. 617,779
Int. Cl. H02n 7/00; F03g 7/06
U.S. Cl. 310—4
2 Claims

ABSTRACT OF THE DISCLOSURE

An electro-mechanical actuator apparatus having oppositely wound, convoluted, juxtaposed, opposing spring members. One of the opposing spring members is a bimetallic spring member having an electrical resistance heating element attached to its outer surface. Upon being electrically energized, the resistance heating element transfers its heat to the bimetallic actuator spring causing the spring to elongate, and thus exert a force which is opposite to, and greater than, the force exerted by the opposing spring member. A structural member retained by the actuator apparatus is thereby moved in this manner from a first to a second predetermined position, and in a predetermined manner, in accordance with control signals transmitted from a remote control station.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

The bimetallic actuator of the invention is an electromechanical apparatus which is operated by energizing an electrical resistance heating element attached to a bimetallic spring actuator member. The elongation movement of the bimetallic spring actuator member is opposed by an oppositely wound, convoluted, juxtaposed, opposing spring member. The bimetallic actuator may be operated from a remote control station.

The prior art for electro-mechanical power controlled actuator apparatus is replete with examples of electrically energized solenoids, complex switching devices, stepping motors, and the like, combined with gears, gear trains and the like. However, most known types of electro-mechanical actuators are, in most instances, relatively heavy, require considerable space, and are most usually difficult to repair, maintain or replace. Additionally, most known types of electro-mechanical actuators lack the reliability required of electro-mechanical actuators which may be utilized for long periods of time without accessibility for adjustment, repair, maintenance or replacement.

SUMMARY OF THE INVENTION

The electro-mechanical bimetallic power controlled actuator of the invention is lightweight, simply constructed, and utilizes only two major movable members within the actuator apparatus. The actuator apparatus provides effective mounting and retaining structure for structural members which are structurally connected to the actuator apparatus. The mounting and retaining structure of the apparatus includes at least two oppositely wound, convoluted, juxtaposed opposing spring members. Since the opposing spring members exert opposing torques on structural members mounted and retained thereby any random movement of these structural members from their originally mounted positions will be opposed by the spring members. Thus, restoring forces are set up for returning the mounted and retained structural members to their initial positions as they were originally mounted and retained by the actuator apparatus.

At least one of the opposing spring members is a bimetallic spring member. When an electrical resistance heating element which is attached to the bimetallic spring is energized, the bimetallic spring is thereby caused to elongate. The resulting increase in torque and elongation of the bimetallic spring causes the structural members mounted and retained by the opposing spring members to be moved in the direction of elongation of the bimetallic spring. Since a definite quantitative relationship exists between the electrical energy supplied to the resistance heating element and the mechanical movement of the bimetallic spring member, accurate and close control of the electrical energy supplied to the heating element results in an accurate and close control of the movement of the bimetallic spring and therefore control of the movement of all the structural members actuated thereby.

Since the electro-mechanical actuator of the invention is lightweight, simply constructed, and utilizes only two major movable members, the actuator is easily repaired, adjusted, maintained, and replaced. The actuator will continuously and accurately operate over long periods of time without the need for repair, maintenance, adjustment or the like.

The concepts of the invention lend themselves to broad applications such as for AC and DC power meters, for example. Similarly, the concepts of the invention may be incorporated into radio frequency power indicators for indicating output from radio transmitters, for example.

Accordingly, an object of the invention is to provide an electro-mechanical bimetallic power controlled actuator which is simply constructed, lightweight, compact and which provides accurate and timely response to signals transmitted from a remote control station.

Another object of the invention is to provide an electro-mechanical power controlled actuator capable of mounting and retaining structural members in a predetermined position, and upon receiving a predetermined signal affecting the timely and accurate movement of the structural members so mounted and retained thereby in a predetermined manner to a second predetermined position and thereafter securely retain the structural members so moved to such a second predetermined position.

The novel features considered characteristic of this invention are set forth with particularly in the appended claims. The invention, itself, its organization and method of operation, as well as additional objects and advantages thereof, may best be understood by reference to the following description when read in connection with the accompanying drawings, in which:

DESCRIPTION OF THE DRAWINGS

FIGURE 1 is a perspective view of a pivotable door assembly shown in its lowered, protective position covering an ultra-violet photometer, and an enclosed actuator apparatus for moving the door assembly;

FIGURE 2 is a perspective view of a pivotable door assembly shown in its upright, open position exposing an ultra-violet photometer, and an enclosed actuator apparatus for moving the door assembly; and FIGURE 3 is a perspective view, with portions of a pivotable door assembly broken away, showing an acutator apparatus mechanically attached to the door assembly which is used for protecting an ultra-violet photometer from excessive solar radiation.

The details of the actuator apparatus 10 of the invention are best shown in FIGURE 3. Referring to FIGURE 3, it is seen that the actuator, apparatus includes at least two oppositely wound, convoluted, juxtaposed, opposing spring members 12 and 14. The spring members 12 and 14 are attached to a base 16. The spring members may be attached to the base by any of several well-known attaching means so that the straightened, elongated, end portions 18 and 20 of the spring members 12 and 14 respectively are securely and immovably attached to the base 16.

The end portions 22 and 24 opposite the straightened, elongated end portions 18 and 20 of the springs 12 and 14 respectively are attached to a shaft 26, for example, as shown in FIGURE 3. The shaft 26 is supported by upright supports 28 and 30. The supports 28 and 30 are securely attached to base 16 by any of several well-known attaching means. The supports 28 and 30 are provided with bearings 32 and 34 respectively. The shaft 26 is retained by, and is freely rotatable within the bearings 32 and 34.

Since most of the weight of shaft 26 is supported by the bearings 32 and 34, little downward force is caused by the shaft 26 on the ends 22 and 24 of the springs 12 and 14 respectively. Because of the support given to the shaft 26 by the support members 28 and 30 through bearings 32 and 34, additional structure may be attached to the shaft 26, between the bearings 32 and 34, without increasing the weight or downward force exerted by the shaft 26 on the springs 12 and 14. Therefore, as can most clearly be seen in FIGURE 3, the shielding door assembly 36 may be attached to the shaft 26 by means of attaching brackets 38 and 40.

The brackets 38 and 40 are provided with openings 39 and 41 of appropriate size for accommodating the exterior diameter of the shaft 26. The openings 39 and 41 of the brackets 38 and 40 have sufficiently close tolerance to the exterior diameter of shaft 26 so that the brackets are securely attached to the shaft. When the door 36 is attached to shaft 26 by means of the attaching brackets 38 and 40, for example, or by any other well-known attaching means, the door 36 is then thereby made to move with the same motion as that imparted to the shaft 26 by the actuator apparatus of the invention.

In order to actuate structural members attached to shaft 26, at least two oppositely wound, convoluted, juxtaposed, opposing spring members, as indicated hereinabove, are utilized. At least one of the opposing spring members is a bimetallic spring. Referring to FIGURE 3 wherein the details of the actuator apparatus of the invention are best shown the spring 12 shown therein is a bimetallic spring. An electrical resistance heating elements 42 as shown in FIGURE 3 is attached to the outer surface of the bimetallic spring 12. The heating element 42 includes bifilar winding leads 44 and 46 which are bonded to the bimetallic spring actuator 12. The bifilar winding leads 44 and 46 are attached to an electrical power supply source 48, also shown in FIGURE 3. The bifilar winding leads may be energized from the electrical power supply source 48 by means of any of several well-known, conventional switching or other electrical power transmitting devices, such as switch 50, for example, as shown in FIGURE 3.

When switch 50 is closed the bifilar winding leads 44 and 46 are energized. Heat produced by the electrical resistance heating element 42 is transferred to the bimetallic spring 12 and the bimetallic spring is thereby made to elongate. In the constructed embodiment of the invention the heating element 42 has a maximum thickness of 0.015 inch.

When heat is transferred to the bimetallic spring 12 and the spring is thereby caused to elongate, the spring 12 exerts a force which is opposite to, and greater than, the force exerted by the opposing spring member 14. Therefore, the shaft 26 and the door assembly 36 attached thereto are moved in accordance with the degree of elongation of the convoluted, bimetallic spring 12 and the force differential between the force exerted by spring 12 and the force exerted by the opposing spring 14. Thus, the movement of the shaft 26, and structural members attached thereto, may be controlled in this manner by means of electrical signals which may be transmitted to the bimetallic spring of the actuator from a remote control station.

The protective door assembly 36, as shown in the drawings, is for utilization aboard the OGO-E spacecraft for the protection of an ultra-violet photometer 52, shown in FIGURE 2, from excessive solar radiation. The protective door assembly is initially latched closed. When a predetermined signal, which may be an electrical signal for example, is transmitted to structure aboard the OGO-E spacecraft, such structure not being shown in the drawings nor germain to the invention, the lath mechanism is actuated and the door 36 is thereby released allowing the door to be freely movable and controllable by the actuator 10 of the invention. When the door assembly 36 is thereafter moved by means of the actuator 10, the ultra-violet photometer 52 is then thereby exposed to, or protected from, solar radiation, in accordance with the controlled movements of the actuator 10.

The actuator 10 of the invention provides timely and accurate actuation and control of the mechanical movement of structural members, such as the door assembly 36, aboard a spacecraft hundreds of miles from the ground control station from which the actuator apparatus is actuated and controlled. The actuator apparatus is lightweight and is easily actuated for producing good mechanical movement.

It has been found that mechanical apparatus attached to the shaft 26, such as the protective door assembly 36 shown in the drawings, may be moved through a wide angle of arc. In a constructed embodiment of the invention a protective door assembly was easily moved through an angle of arc of 110°. Movement is initiated by a command telemetry signal, for example, which may establish the amount of power and the length of time electrical power is applied to the bifilar windings 44 and 46 attached to the bimetallic spring of the actuator 10.

The actuator apparatus 10 normally operates from a power supply source of 23.5 to 33.5 volts, but the actuator will operate successfully, accurately and consistently from a 10 to 11 volt power supply source. The actuator apparatus of the invention provides for a compact, easily actuated electro-mechanical control having predictable and accurate movement directly related to the power input to an electrical resistance heating element.

In providing for an actuator apparatus for use aboard a spacecraft a maximum utilization of space combined with minimum weight is required of the actuator apparatus. It has been found that maximum movement through an arc of 110°, for example, may be realized in the smallest possible space by utilizing spiral coiled spring members such as shown in the drawings. A bimetallic spring is used to achieve a maximum metal length per volume ratio. The bimetallic spring 12 utilized in the actuator 10 provides a force sufficient to overcome the friction of the door pivot bearings, and also provides enough force to compensate for the spring rate force produced by the convoluted, juxtaposed, opposing spring member 14. The opposing spring member 14 is utilized as an ambient temperature compensating device. The two convoluted spring members 12 and 14 are placed opposite each other so as to provide opposing forces and so as to produce equal torques during ambient temperature variations. Thus any movement which may be caused by ambient temperature variations will be nullified because of the opposing forces produced in the opposing spring members.

Since the opposing spring members 12 and 14 exert opposing torques on the door assembly 36, any random movement of the door assembly 36 after it is unlatched from its initial position will be opposed by the spring members. When it is desired to move the door assembly 36 from a first position to a second position the bifilar winding leads 44 and 46 are energized. Since a definite quantitative relationship exists between the electrical energy supplied to the resistant heating element 42 and the mechanical movement of the bimetallic spring 12 accurate and close control of the electrical power transmitted to the heating element 42 results in an accurate and close control of the movement of the bimetallic spring 12 which therefore produces accurate and close control of the movement of the door assembly actuated by the bimetallic spring.

In providing for an electrical resistance heating element, such as the heating element 42 shown in the drawings, the heater was bifilar wound so as to eliminate magnetic field effect. In order to keep the heater thickness to a minimum the heater was bonded directly to the bimetallic spring coil instead of being bonded to a substrate which would then in turn be bonded to the bimetallic spring. It was found necessary to keep the heater thickness to a minimum in order to alleviate frictional forces which could be created by excessively thick heaters rubbing or binding on an adjacently disposed spiral of a spring member during the deflection cycle of the spring. Also, in order to obtain maximum heat transfer the heater element was firmly bonded to the surface of the bimetallic spring 12.

In providing for an actuator apparatus in accordance with the concepts of the invention it is recognized that many modifications may be made in the arrangements as shown in the drawings without departing from the true spirit of the invention. For example, the protective door assembly 36 may be made movable about a stationary shaft. The opposing spring members 12 and 14 may be securely and immovably attached to the stationary shaft, or to a base 16, for example, with the movable and actuating ends of the spring members attached to the door assembly 36 by any of several well known attaching means for movement of the door assembly about the stationary shaft, for example.

It is recognized that the door assembly 36 may be spring biased to a position whereby the ultra-violet photometer 52 may be either protected from or exposed to solar radiation when the door assembly is initially released from its latched position. In the constructed embodiment of the invention the door assembly 36 was spring biased to a position which exposed the ultra-violet photometer 52 to solar radiation when the door assembly was initially released from its latched position. Subsequently to being released from its latched position the door assembly may then be moved to a desired position by means of the actuator 10 of the invention.

It is appreciated that various and sundry modifications may be made in the arrangements as shown in the drawings by those familiar with the art without departing from the true spirit of the invention. Therefore, all such modifications and equivalents are deemed to fall within the scope of the invention as claimed in the appended claims.

What is claimed is:

1. An electro-mechanical actuator apparatus including:
    a base;
    a pair of convoluted, juxtaposed, oppositely wound spring members having respective end portions attached to said base to cause said spring members to be mounted coaxially on said base and spaced from one another, at least one of said spring members having a bimetallic construction;
    a pair of upright supports mounted on said base;
    a shaft rotatably supported by said upright supports and extending coaxially through said spring members, the opposite ends of said spring members being respectively attached to said shaft;
    equipment mounted on said base;
    a door attached to said shaft between said upright supports for shielding said equipment and movable by said shaft angularly between a closed and an open position; and
    means for heating said bimetallic spring members to cause said bimetallic spring member to elongate and exert a torque on said shaft greater than the torque exerted by the other of said spring members thereby causing said shaft and said shielding door attached thereto to move angularly in accordance with the degree of elongation of said bimetallic spring member so as to expose the aforesaid equipment.

2. The actuator apparatus defined in claim 1, and which includes an electrical heating element having bifilar winding leads bonded to said bimetallic spring member; and in which said heating means includes a source of electrical energy and switching means for controlling the application of said electrical energy to said heating element.

References Cited

UNITED STATES PATENTS

| 2,777,077 | 1/1957 | Lorini | 310—4 |
| 2,350,170 | 5/1944 | Kinnard | 310—4 X |
| 2,325,438 | 7/1943 | Thomas et al. | 324—106 |

FOREIGN PATENTS

| 361,967 | 11/1931 | Great Britain. |
| 721,366 | 1/1955 | Great Britain. |

MILTON O. HIRSHFIELD, *Primary Examiner.*

D. F. DUGGAN, *Assistant Examiner.*

U.S. Cl. X.R.

58—23; 60—23